Patented Feb. 24, 1953

2,629,722

UNITED STATES PATENT OFFICE 2,629,722

METHOD OF COOKING OIL BEARING VEGETABLE SEEDS AND NUTS

John W. Dunning, Lakewood, Ohio, assignor to The V. D. Anderson Company, Cleveland, Ohio, a corporation of Ohio No Drawing. Application May 10, 1950, Serial No. 161,268

3 Claims. (Cl. 260—412.4)

This invention relates in general to the art of extracting oil from vegetable seeds and nuts such as flax seed, soy beans, castor beans, peanuts, cottonseed and the like. The invention more particularly relates to a novel and improved process for cooking material of the nature above indicated whereby to secure the maximum quantity of oil at the highest quality, and a meal relatively free of toxic ingredients and of the highest nutritive value. The cooking process of my invention occurs prior to the customary mechanical expressing step or solvent extraction step, and may most advantageously be effected prior to the combined expression and extraction process disclosed in my copending application for United States Letters Patent, Serial Number 63,223, filed December 2, 1948, for Oil Extraction Process.

As is at present known to those skilled in the art of deriving oil from vegetable materials of the type above characterized, it is customary to subject the oil bearing material to a preliminary treatment involving the application of relatively elevated temperatures for a fairly extended period of time, as well as the regulation of the aqueous content of the material. In the best practice so far developed the initial moisture content is limited to a maximum value of about 11%, and the oil bearing material, with the initial moisture controlled as indicated, is cooked to a final temperature of 240° F. to 270° F. and to a final moisture content of 3 to 5% over a period of 50 to 120 minutes.

As will later appear, one phase of my invention involves the discovery that if the best results are to be achieved in oil and meal production, (1) the above moisture content is too low, (2) the evaporation of moisture is deleterious, (3) the above temperature is far too high; and (4) the above time at temperature is much too long.

Vegetable seeds and meats consist primarily of oil, proteinaceous material, and fiber. Vegetable seeds and meats also contain many minor constituents, some of which, for example the phospholipids, as well as the albumin proteinaceous material, are in the fluid state, and, if they remain fluid, are extracted with the oil. It is undesirable to contaminate the oil with the non-oil fluid fractions of the seeds or meats and one primary purpose of cooking vegetable seeds or meats is to change the physical state of the protein fraction and the phospholipids so that they become less fluid, and remain with the fiber while the oil is being expressed or extracted.

Vegetable oils from soy beans, cottonseed, flaxseed and the like, according to methods of the present art, just after extraction are clear after the final filtration step. However, after standing for a short period they begin to cloud up, and a sediment begins to settle. In some oils sedimentation may take place slowly. By a refining process the oil may be cleared, and the sediment settled, but there is an oil loss in this refining step. This oil loss, from prime seed, as experienced in prior art practice, was sometimes as high as 7 to 12% when analyzed by the regular method. By the methods of cooking as disclosed hereinbelow the sedimentary or proteinaceous and phosphatidic material is largely rendered insoluble so that it remains with the meal of the seed or meat and is not removed in any appreciable quantity with the oil. As a result, the refining loss of oils prepared in accordance with the present invention is distinctly lower than in oils produced heretofore in the art. By my improved process the oil loss does not exceed about 3 to 5 percent. This of course, offers an improved economy to the oil extraction process.

In addition to the more or less fluid constituents of vegetable seeds and nuts which adversely affect oil quality according to practices of the prior art, certain seeds and nuts contain toxic ingredients which may appear in the product oil or more commonly in the extracted meal. An example of these toxic factors are the toxic ingredients in cottonseed associated with the gossypol of cottonseed meats. Cottonseed meals produced according to practices of the prior art may contain an amount of gossypol as high as 0.4%. It is common knowledge that such meals have a limited market because of this gossypol content. Although these meals find an outlet in cattle feeds, such meals have limited usage in chicken and swine feeds. According to the methods of this invention such toxic ingredients of vegetable seeds and meats are detoxified. Cottonseed meals, for example, when produced according to the methods of this invention, contain as low as 0.03% gossypol. This detoxification of cottonseed meal, for example, provides potential markets for the meal which were formerly closed to it.

Many vegetable seed and nut meals are purchased today solely on the physical appearance and texture of the meal. However, the trend is to purchase these meals on a nutritive basis. In rationalizing this factor, it is common knowledge that a boiled egg is more nutritious than an egg fried at very high temperature. The boiled egg provides a sprongy, fibrous, absorptive protein structure on which the digestive juices may readily act. On the other hand, the brown horny protein structure of a high temperature fried egg is not spongy and absorptive and offers considerable resistance to the digestive juices. Similarly, a vegetable seed or nut meal, prepared according to the methods of this invention of cooking at relatively low temperatures for a short time in the presence of relatively high moisture content provides a spongy, fibrous, absorptive protein structure. This structure not only readily gives up its oil, but also may be readily acted upon by the digestive juices of the animal. On the other hand, vegetable seeds or nuts cooked according to the practices of the prior art, wherein they may be cooked at temperatures as high as 250 to 270° F. for long periods of time, and at relatively low moisture content, provide a more horny protein structure.

Briefly summarizing the objects of the present invention, I aim to provide a simple and effective cooking treatment applicable to oil bearing vegetable seeds and nuts prior to extraction of oil therefrom, the results of the treatment being to achieve maximum quantity and highest quality of the oil; to provide a meal of highest nutritive value consistent with quality; to prevent contamination of oil by fluidized proteinaceous material; to denaturize or coagulate the soluble protein fractions so that they are not expressed with the oil; to provide a porous and fibrous protein material; to precipitate the phosphatidic materials in the solid mass whereby they are not expressed or extracted with the oil; to prevent oil loss in refining by reducing sedimentation; to free the meal from toxic factors such as those usually associated with gossypol fractions; to enable the oil to be extracted at lower pressures; and to achieve higher oil yields even at such lower pressures.

I have discovered that the foregoing objects are accomplished first by subjecting the oil bearing material to a cooking process in which the significant steps vary to a material extent from the practices of the prior art. Whereas the prior art maintained the moisture content at less than 12 per cent during the cooking step, I maintain the moisture content at between 12 and 20 per cent. As a result of extensive tests I have determined that the practices of the prior art produced a hard, horny, dry material from which oil is extracted only with relative difficulty. In theory this hard material gives good "body" for mechanical expression, but actually the hard cellular structure yields the oil only grudgingly and inefficiently. While I achieve good results with a moisture content range of about 12 to 20 per cent, I normally recommend and use a moisture content of about 12 to 14 per cent. The manner of achieving this will be disclosed in a specific example hereinafter.

Whereas in prior art practice the oil bearing material was heated to a relatively high temperature, for example 240° F. to 270° F., for a relatively extended period of time, for instance 80 to 120 minutes, I have found that the hereinbefore detailed objects and advantages of the present invention are achieved by heating at a temperature of between 190° F. and 215° F. for a relatively short time, for example between 7 to 20 minutes. For hydraulic or screw press extraction of oil, the time may be between 12 and 20 minutes, and I prefer a treatment not exceeding 15 minutes. If the oil is to be extracted by a combined process involving mechanical pressure followed by solvent extraction, in the novel manner disclosed in my aforesaid copending application, the cooking time can be shortened to a period between 7 and 15 minutes.

In the prior art, it has been necessary to comminute the raw materials into particle size of .008 to .010″ in order to obtain rapid and uniform heat transfer during the cooking stage. This comminution was preferably done in a multistage rolling mill although single stage rolling mills, as well as hammer mills have been used. Although according to the practice of this invention it is necessary to comminute the raw material before cooking, one of the advantages of the methods of this invention lies in the fact that the thickness of the particles to undergo the cooking process is less critical than in the prior art because of the moisture and temperature conditions of the cooking process. The particle thickness for the methods of this invention need not be controlled closer than within the limits of .005 to .025″ thickness.

For example, according to the prior art of cooking cottonseed meats, a 5-high stand rolling mill having a 20″ x 60″ bottom roll was recommended to comminute the meats from 100 to 110 tons of cottonseed per 24 hour day. By the use of the methods of this invention the same size rolling mill can comminute the meats from 210 tons of cottonseed per 24 hour day.

As previously mentioned, the cooking process, according to methods of this invention, are conducted at a temperature of 190 to 215° F. for a period of time from 7 to 20 minutes at a moisture content ranging from 12 to 20%. The attaining of this moisture content may be accomplished by the addition of steam and/or water to the mass of meats entering the cooking vessel. Since the minimum moisture to be attained is approximately 12%, the ratio of water to steam added to the raw material entering the cooking vessel may be varied according to the moisture content of the raw material. For example, if the raw material contains approximately 7% moisture a mixture of steam and water in the ratio of approximately 2 to 1 may be employed. This particular mixture of steam and water provides sufficient moisture for wetting of the raw material, and at the same time, it also provides heat for raising the temperature of the raw material to approximately 190° F. If the moisture of the raw material is higher than 7%, for example 9 to 10%, the ratio of steam to water is increased so that less actual water will be added to the raw material in attaining the temperature of approximately 190° F.

According to the methods of this invention it is desirable to use live steam as the primary source of heat for raising the temperature of the vegetable seeds or nuts to the cooking temperature. The use of live steam in a mixture with water provides a moist heat which permits very rapid heat transfer to the mass of seeds or nuts. The secondary source of heat is provided by the steam jacket of the cooking vessel. The use of live steam and water as the primary source of heat and moisture not only permits the desirable shortening of the cooking time but it also prevents localized overheating of the vegetable seeds and nuts in contact with the steam jacketed surfaces.

In following the methods of this invention it is necessary that no real evaporation of moisture from the seeds or meats take place during the cooking process. The prior art for screw press operation states that vegetable seeds and nuts at a moisture content of, for example, 11% shall be cooked to a final temperature of 245° F. and a final moisture of 3%. It has been discovered that such directions even at lower temperatures and higher initial moistures do not give the desirable results of this invention if evaporation of moisture takes place during the cooking stage. This effect is illustrated in the table hereinbelow.

In order that the method of cooking, as disclosed in the present specification, may be carried out in the most uniform manner, I prefer to comminute the oil bearing material or meat, after delinting and/or hulling depending upon the specific vegetable seed and before cooking, in the usual single or multistage rolling mill, or by a hammer or an attrition mill. This enables the heat transfer to be more rapid and uniform. In one specific mode of operation cottonseed meats were rolled to .015" flakes and continuously charged into a steam jacketed cooker provided with water and steam sparging lines. The moisture content of these meats was 7.15%. The ratio of water to steam added to the meats was about one part of water to seven parts of steam. The steam water spray was discharged into the cooker at the feeding end in such volume as to maintain the moisture content constant at about 13 percent. The time the material remained in the cooker was about 15 minutes. Immediately upon entry the sparged steam raised the temperature of the charge to about 180° F. Sufficient steam was admitted to the steam jacket of the treating vessel to raise the temperature of the charge to 210° F. The cooked material was continuously withdrawn from the cooker at a measured temperature of 210° F. and a moisture content of 13%. It was then dried to a moisture content of about 5 percent, a value here found to be suitable for full oil extraction by means of the mechanical screw press. The refining loss of the resultant oil was between 3% and 5%, as compared with about 10 to 11% for oil resulting from prior art cooking technique. The resultant meal contained only negligible quantities of toxic ingredients. Actually the amount of gossypol in the meal was 0.04%.

While the moisture content before screw press extraction after prior art cooking should be reduced to approximately 3%, I have found that after cooking in accordance with my present invention the moisture content can be as high as 5% to 5.5%, for complete full press extraction. This provides a more ductile cake from the screw press, permitting longer wear of press parts. As a matter of fact, if the material is to be treated in accordance with the teachings of the invention disclosed in my above acknowledged copending application, the moisture content may be as high as 7% whereas in prior practice 5% was regarded as the permissible maximum.

In the practice taught in said copending application, vegetable seed high in oil content is first mechanically expressed to reduce the oil content to about one-fourth the total protein content in the seed cake. The cake is then comminuted and flaked to a flake thickness from .005 to .02 inch in thickness, and, after moisture and temperature factors are suitably regulated, the flakes are solvent extracted. In said prior inventive process the advantageous result achieved thereby was a ductile, nonfriable flake which lent itself readily to solvent extraction without undue development of fines in the solvent extraction process.

I have found that extremely satisfactory overall results are achieved by first cooking the seed meats in accordance with the teachings of the present specification, and then subjecting the cooked seed to the process outlined in the copending application. A vegetable seed cooked as herein described, and with a cooking time of 7 to 15 minutes, yields ultimate flakes from the press cake which are tough and ductile, and do not develop appreciable fines in the subsequent handling and extraction steps. This particular advantage results in lower labor and operation costs and a higher yield of oil.

As one specific example of the use of the present invention combined with the practice taught in the said copending application, the meats derived from cottonseed at the rate of 210 tons per day were comminuted to particles of .020" thickness. These comminuted particles were cooked at 13.5% moisture at 205° F. for a period of 12 minutes in a continuously operated steam jacketed cooker. The meats contained an original moisture content of 9.5%. A steam-water sparge in the rates of 8 to 1 was employed to give a moisture content of 13.5% and an initial temperature of 185° F. The cooked meats were then dried to 7% moisture content in a horizontal steam jacketed drier at a maximum temperature of 220° F. The oil produced by the method taught in the said copending application had a refining loss of only 3.8%. The product meal had a gossypol content of 0.03%.

The data in the table obtained from commercial scale operations on cottonseed further illustrate the advantages of the methods of this invention.

*Table*

| | Prior Art | Prior Art | Methods of This Invention |
|---|---|---|---|
| Moisture at Beginning of cooking operation, percent | 10.6 | 13.0 | 13.5 |
| Moisture at End of Cooking operation, percent | 4.5 | 4.6 | 13.5 |
| Time of Cooking, Minutes | 50 | 50 | 15 |
| Final temperature of cooked meats, ° F | 235 | 240 | 220 |
| Refining Loss of Product Oil, Percent | 11.8 | 11.8 | 3.8 |

A further advantage realized by the methods of cooking, as above described, regards the relative ease with which the oil may be expressed from the cooked vegetable seed or nut meats as compared to the prior art. When vegetable seeds or nut meats are cooked according to the methods of this invention the fibrous, spongy nature of the protein constituents are readily compressed and these same constituents readily give up their oil. According to the methods of the prior art, wherein the oil is expressed from a vegetable seed by means of a mechanical screw press the residual oil in the finish meal may range from 4 to 5%. When the methods, according to the present invention are utilized, the residual oil in the meal from the same type of mechanical screw press operation may be as low as 3.0 to 3.5%, and when the methods of the present invention are combined with those of my prior copending application the residual oil may be materially less than 0.5%.

What I claim is:

1. A method of treating oil bearing seed and nut meats prior to extraction of the oil therefrom, comprising raising the moisture content of the meats to a value between 12 per cent and 20 per cent, and cooking the meats for a period between 7 and 20 minutes at a temperature of between 190° F. and 215° F. under such conditions that evaporation does not reduce the moisture in the seed or nut meats below 12 per cent.

2. A method of cooking oil bearing seed and nut meats prior to extraction of the oil therefrom, comprising continuously charging said meats into a cooking vessel, sparging live steam and water into the meats at the feed end of said vessel thereby to rapidly raise the moisture and temperature of the meats to about 180° F. further rapidly raising the temperature and moisture content of the meats to between 190° F. and 215° F. while maintaining the meats in the vessel for between 7 and 20 minutes while maintaining the moisture content thus gained by the meats without appreciable evaporation of moisture taking place and thereafter discharging the meats from the vessel.

3. In preparation for the process of extracting oil from nut and seed meats wherein the material is subjected to the successive steps of mechanically expressing some of the oil, while retaining in the material after the expressing step a natural oil content of about one-fourth the total protein content as existing at the termination of the expressing step, comminuting the resulting press cake, flaking the comminuted cake, and finally solvent extracting the residual oil from the flakes, the novel preparatory steps of raising the moisture content of the meats to a value in excess of 12 per cent, and cooking the meats for from 7 to 15 minutes at a temperature between 190° F. and 215° F.

JOHN W. DUNNING.

REFERENCES CITED

The following references are of record in the file of this patent:

UNITED STATES PATENTS

| Number | Name | Date |
|---|---|---|
| 312,674 | Thornton | Feb. 24, 1885 |
| 843,983 | Woodward | Feb. 12, 1907 |
| 1,164,383 | Nelae | Dec. 14, 1915 |
| 1,928,241 | Barton | Sept. 26, 1933 |

OTHER REFERENCES

Alton E. Bailey: text "Cottonseed and Cottonseed Products," published 1948 by Interscience Publishers, Inc., New York, pages 615 to 627.